United States Patent [19]

Tentler

[11] Patent Number: 5,394,639
[45] Date of Patent: Mar. 7, 1995

[54] TROLLABLE BAIT BUCKET AND BAIT KEEPER

[75] Inventor: Lynn A. Tentler, Fond du Lac, Wis.

[73] Assignee: Tru-Fire Corporation, North Fond du Lac, Wis.

[21] Appl. No.: 964,735

[22] Filed: Oct. 22, 1992

[51] Int. Cl.$^6$ ............................................. A01K 97/04
[52] U.S. Cl. ............................................. 43/56; 43/55
[58] Field of Search ........................................ 43/55, 56

[56] References Cited

U.S. PATENT DOCUMENTS

| | | | |
|---|---|---|---|
| 2,657,496 | 11/1953 | Spotswood | 43/55 |
| 2,834,145 | 5/1958 | Kisiel et al. | 43/56 |
| 2,842,890 | 7/1958 | Goroni | 43/55 |
| 3,009,281 | 11/1961 | Unger | 43/56 |
| 3,513,584 | 5/1970 | Donner | 43/56 |
| 3,726,039 | 4/1973 | Borrelli | 43/56 |
| 3,728,812 | 4/1973 | Woolworth | 43/56 |
| 4,019,274 | 4/1977 | Landell | 43/56 |
| 4,260,070 | 4/1981 | Pierson | 43/56 |
| 4,554,757 | 11/1985 | Sakuta | 43/56 |
| 4,686,788 | 8/1987 | Hartman | 43/56 |

Primary Examiner—Kurt Rowan
Attorney, Agent, or Firm—Robert C. Curfiss

[57] ABSTRACT

A live bait storage system for keeping bait for long periods of time without maintenance includes a portable, trolling bait container which has one side hydrodynamically contoured to permit the container to be readily trolled through the water in a predictable and controlled course. The portable bait container is adapted for use in conjunction with a long-term bait keeping station which is uniquely designed to permit bait to be transferred between the station and the container without manual handling and without injuring the fragile bait species. A rimless pour spout is provided for this purpose. The bait station is adapted to be suspended in a pre-selected support zone in a body of water for providing the bait species with proper temperature conditions and aeration and for supplying natural food supplies to the bait while stored.

12 Claims, 2 Drawing Sheets

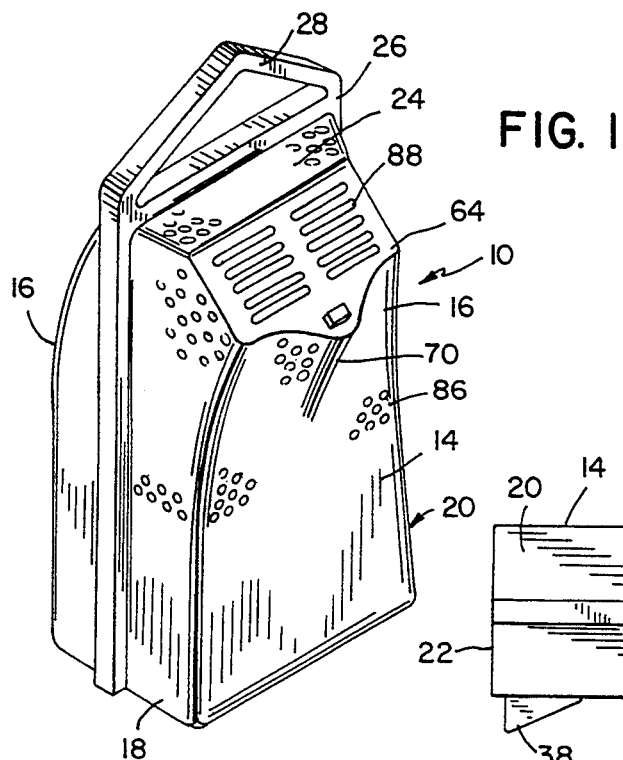
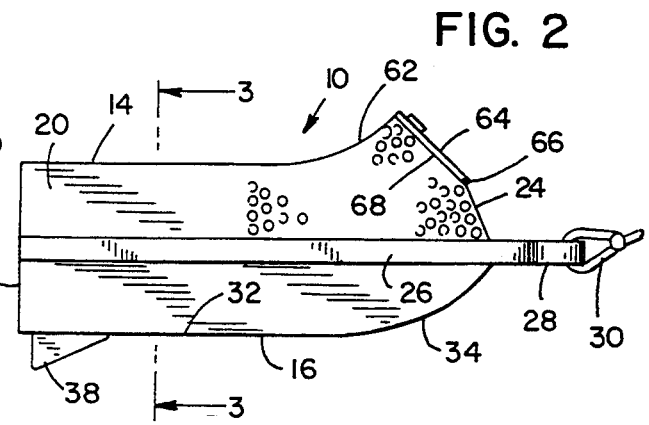
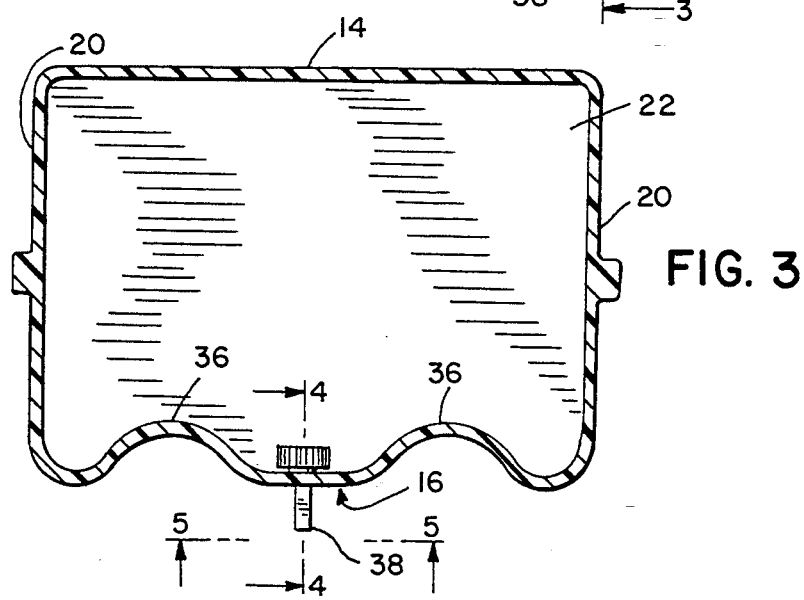
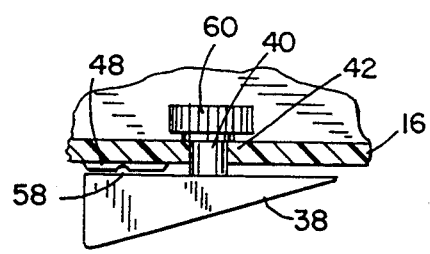
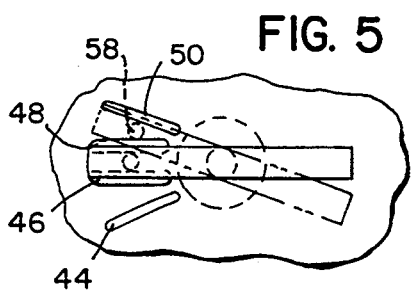

TROLLABLE BAIT BUCKET AND BAIT KEEPER

BACKGROUND OF THE INVENTION

1. Field of the Invention

The subject invention is generally related to containers for storing live bait and is more specifically directed to a trollable bait container and a live bait station.

2. Description of the Prior Art

Live bait storage units or stations are known in the art. Typically, they comprise a perforated, closed container having a closable hatch. Generally the live bait stations are attached to a line and dropped into a source of water. In some instances, a second outer container is used in conjunction with the bait station, whereby the bait station is placed into a water-cooled outer container for maintaining the bait in circumstances where a source of water is not readily available.

Many prior art bait stations include a large, permanently mounted tank with a source of water and pump for keeping the water aerated in order to maintain the tank in a life-supporting condition. Such tanks are generally kept in bait houses or similar locations where a power source is available for running the aerator pump. This precludes placement of the bait station at a location near use of the bait. This is particularly disadvantageous when live bait is used at remote fishing camps where no power source is readily available. This creates a significant problem for certain types of fishing activities. Typically, it is not possible to keep bait alive for long periods of time in such locations, requiring frequent replenishment of the bait supply during the fishing season.

Another disadvantage with respect to the bait stations of the prior art is the difficulty in removing bait from the bait station and placing it in a portable container for use. In most instances, a net or seine or the like is utilized for trapping the bait and lifting it out of the station and into a container. This is a time consuming chore at best. Also, manipulation of the bait in this manner can traumatize or injure the live bait specimens, often leading to premature death, resulting in increasing the expense of using and maintaining such bait.

The bait containers of the prior art also have certain drawbacks in handling bait when positioned in the portable unit for use. In most cases the opening includes a lip or rim adapted for holding a lid in a closed position. The lip or rim interferes with and, in some instances, can injure fragile bait species. Also, while the portable containers are easily transferred from place to place while fishing, they are not generally well suited for certain types of operations such as by way of example, trolling and the like. Another disadvantage to the bait stations and bait containers of the prior art is the inability to keep bait alive for long periods of time while in a container adapted to be submerged in the primary body of water. The portable containers of the prior art are not well suited for this purpose. In addition, where portable containers are adapted to be placed into a larger storage container, these containers generally are placed at or near the bottom of the body of water where the water is least aerated, further decreasing the ability to maintain the bait alive at remote locations for long periods of time.

While certain of these problems have been resolved by providing live bait wells in boats, or providing portable aerators which can be powered by the twelve volt power system in many boats, these are expensive and marginally desirable solutions, taking up valuable boat space and requiring additional maintenance between fishing operations. Further, live bait wells are not readily adapted for moving bait from a long term storage station and the well. Typically, the bait has to be netted and transported from container to container, with a potentially negative impact on the stability and viability of the bait.

SUMMARY OF THE INVENTION

The subject invention provides a bait storage station and a portable trolling bait container adapted to be used independently or in conjunction with one another, providing a long term storage station for the bait while also providing a portable trolling bait container readily usable during fishing operations.

The portable bait trolling container is unique in that it is readily trollable behind a boat during trolling operations, while at the same time being easily portable. The bait storage station is compatible with the portable bait container and is adapted to readily permit pouring of bait from the container into the station and vice versa. The pouring openings or spouts in the container and the station are both designed to minimize spillage and to minimize injury to the bait species as it is transferred.

It is a particularly important feature of the invention that the bait storage station is designed to be suspended in the water for maintaining the bait in a desired water zone where the water condition best provides the life support requirements for the particular bait species being used. This permits the bait to be stored for long periods of time without human intervention, providing natural feeding capability for the bait, as well as well aerated water at optimum temperatures.

In the preferred embodiment of the invention, the portable bait container comprises a trollable bait bucket with at least one side which is hydrodynamically shaped for permitting the bucket to be pulled through a body of water with a minimum of resistance, making the container ideal for trolling operations. Control means such as, by way of example, a rudder is provided on the container for controlling the orientation and direction of the container when it is pulled through the water, assuring that the container is towed in a generally predictable course while reducing drag. In the preferred embodiment, the rudder control may be adjustable to permit the trolling container to be towed at a predetermined angle from the towing vessel, assuring that the trolled container does not interfere with fishing operations.

The long term bait storage station is used either in combination with the container or independently for storing bait for long periods of time between fishing operations. In the preferred embodiment, the storage station also contains an integral pour spout of a shape and design similar to that provided on the trolling bait containers, permitting ready transfer of live bait from the station to the container and vice versa. The long term storage station may be subdivided into a plurality of compartments, each with an individual pour spout whereby a variety of different types of bait may be stored in one container.

In both the station and the container, the pouring spout may be large enough to accommodate a hand whereby bait may be manually removed, or a separate opening may be provided for this purpose. A lid for closing the opening each pour spout may be provided and in the preferred embodiment is an integral part of the container and is secured to the container by means of a live hinge. A latch may be provided for locking the lid in a closed position.

Both the station and the container are provided with through vent holes, whereby fresh water may enter into the container on a natural and continuing basis when the containers are placed and suspended in a body of water. Each of the containers also includes an integral handle for carrying the containers, the handle being of sufficient strength to permit a tow line to be attached to the handle for trolling the bucket or for lifting the long term storage station to the surface.

The trollable bait container and storage station combination of the subject invention provides a substantially improved system for storing and using bait during fishing operations. The unique pour spouts permit bait to be transferred between containers without injuring fragile bait and without manual handling. The trollable bait bucket and station continuously expose bait to a fresh water supply without the use of an aerator and without the use of a live boat well. The integral construction of the containers provides for an inexpensive, aesthetically pleasing product which can be manufactured and priced competitively with the less advantageous bait storage systems of the prior art.

It is, therefore, an object and feature of the subject invention to provide a bait keeping station for maintaining a substantial quantity of live bait while readily permitting a portion of the bait to be removed from the station without manual handling.

It is also an object feature of the subject invention to provide means for transferring bait into and out of a long term bait keeping station without injuring the bait.

It is a further object and feature of the invention to provide a portable bait container which may be used at a location remote from the bait station, wherein the bait container may be readily trolled behind a boat without interfering with fishing operations.

It is yet another object and feature of the invention to provide a bait keeping station wherein live bait may be suspended in a controlled environment without the use of aerators, pumps or the like.

Other objects and features of the invention will be readily apparent from the accompanying drawings and detailed description of the preferred embodiment.

BRIEF DESCRIPTION OF THE DRAWING

FIG. 1 is a perspective view of a bait container in accordance with the subject invention.

FIG. 2 is a side plan view of the bait container of Fig. 1.

FIG. 3 is an enlarged sectional view taken generally along the line 3—3 of FIG. 2.

FIG. 4 is an enlarged, fragmentary section view taken generally along the line 4—4 FIG. 5.

FIG. 5 is a fragmentary view looking in the direction of the line 5—5 of FIG. 3.

DESCRIPTION OF THE PREFERRED EMBODIMENT

Figure 6:
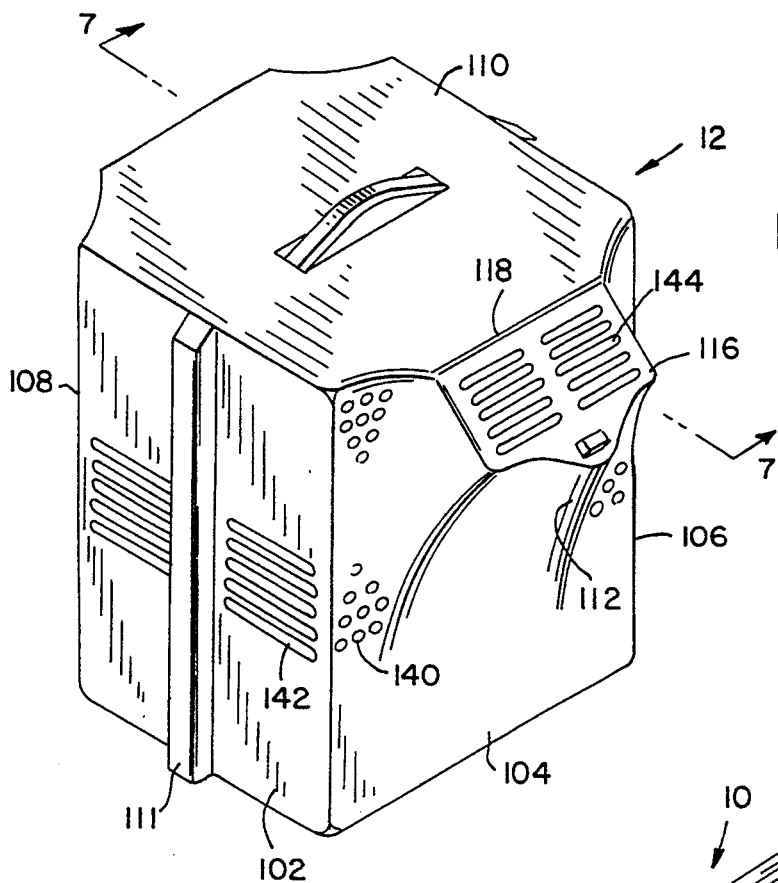
FIG. 6 is a perspective view of a long term bait storage station in accordance with the subject invention.
Figure 7:
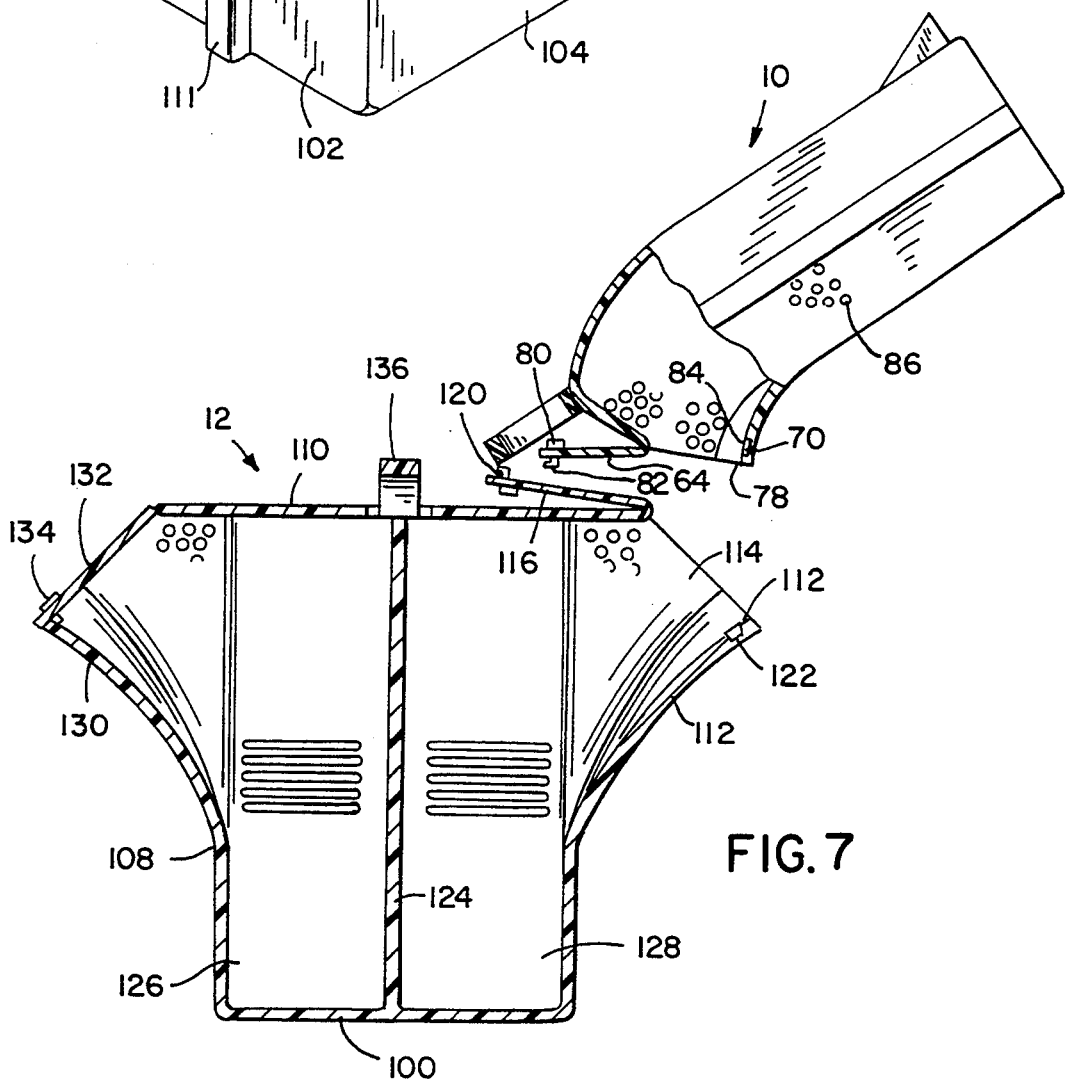
FIG. 7 is a section view of the station of FIG. 6, taken generally along the line of 7—7 of FIG. 6, and showing the bait storage station as used in conjunction with the bait container of FIGS. 1-5.

The bait keeping system of the subject invention includes a portable bait container or bucket 10 as shown in FIGS. 1-5 and a long term bait storage station 12 as shown in FIGS. 6 and 7.

In the preferred embodiment, the bait bucket 10 is made of a container having a plurality of side walls 14, 16, 18 and 20, a closed bottom 22 and a substantially closed top 24. The container may be of an integral construction and may include a peripheral rib 26 extending about the container for increasing the rigidity of the structure. An integral handle 28 may be formed in the rib adjacent to the upper or top wall 24. The handle 28 is of sufficient size to permit the container to be towed or carried by a tie line 30, as specifically shown in FIG. 2. It will be understood by those skilled in the art that the specific construction of the container is a matter of choice as long as the important features and functions of the bait keeping system are met, as herein described.

In the preferred embodiment of the invention, the container includes one side wall 16 which is hydrodynamically shaped, as best shown in FIG. 2. The side wall 16 includes a straight section 32 extending substantially parallel to the rib 26 in an upwardly curved radius 34 adjacent to the top wall 24. This provides a hydrodynamically shaped surface, readily permitting the container to be pulled through the water by line 30, making the container ideal for trolling /perations and the like.

Where desirable, a pair of elongated, concave channels 36 (FIG. 3) may be provided in the side wall 16 along the straight section 32 for directing water flow along the side wall 16 as the container is trolled through the water. The channels 36 also assume that the container is trailed in a predictable course relative to the towing vessel. The channels 36 also reduce water turbulence, assuring that the container stays in an upright position (see FIG. 2) during trolling operations.

In the preferred embodiment, control means such as the rudder 38 is positioned substantially along the center of the side wall 16 (FIG. 3) and projects downwardly from the straight section 32. The rudder 38 controls the course of the container during trolling operations. The rudder 38 may be mounted on a post 40 which is received in a through hole 42 provided in the side wall 16 (FIG. 4). The upper end of the post 40 may be threaded for receiving a knurled nut 60. An abutment surface 58 may be provided on the upper surface of the rudder 38 and the side wall 16 may include a plurality of evenly spaced rigs 44, 46, 48 and 50 (see FIG. 5). This permits the rudder to be positioned in any of a variety of positions, for controlling the direction and the position of the container 10 when it is trolled behind a boat. For example, if the rudder is in the center position as shown in FIGS. 3, 4 and 5, the container will troll directly behind the boat in a straight line with the tow line 30. If the rudder is moved to the position shown in phantom in FIG. 5, the container 10 will be directed outwardly from the boat when pulled by the line 30. This permits the container to be positioned behind a trolling boat in such a manner that it does not interfere with fishing operations.

In the preferred embodiment of the invention, the upper side wall (a shown in FIG. 2) is also curved as at 62 to conform substantially to the shape of the curved front portion 34 of side wall 16. The top wall 24 includes an opening 68 large enough to accommodate a hand for removal of bait from the container. In the preferred embodiment, the top wall 24 includes an integral lid section 64 adapted to close the opening 68 for maintaining bait in the container. The lid 64 may be secured to the top wall 24 along a live hinge 66.

The central area of the curved portion 62 of side wall 14 is formed into a pour spout 70, as shown in FIG. 1. As is better shown in FIG. 7, this pour spout 70 is straight walled having an upper edge 78 which is free of a lip or rim, improving the flow out of the pour spout and assuring that the edge of the pour spout does not obstruct the flow of bait as it is poured from the container. The pour spout and hand-opening may be separate, if desired.

A latching mechanism such as, by way of example, the sliding latch 80 is carried in the hinged lid 64 and includes a latch strike 82 which is adapted to be received in the recess 84 provided adjacent to the outer end 78 of the pour spout. In the preferred embodiment, the sliding latch 80 is spring loaded so that it is always biased toward the locking position. This assures that the lid 64 stays in the closed, locked position whenever the lid is closed over the opening 68 of the container.

As is typical, the container 10 includes a plurality of through holes 86 in the side walls 14, 18 and 20. In the preferred embodiment it has been found beneficial to eliminate holes below the rib 26 and in the bottom 22 and hydrodynamic side wall 16 (see FIG. 2), assuring that the through holes do not interfere with the trolling of the bait bucket through the water. Also, the lower half of the side walls do not include any through holes, assuring that a certain amount of water is maintained in the bucket when it is lifted from a body of water in order to remove bait from the container. Where desired, water openings such as slots 88 may also be provided in the lid 64.

While the bait container 10 is useful in any application where portable bait keepers are needed, the container 10 is ideally suited for use in combination with a bait storage station 12, as shown in FIGS. 6 and 7.

The storage station 12 may comprise a closed chamber of integral construction including side walls 102, 104, 106, 108, a closed bottom 100 and a closed top 110. Where desired, external ribbing 111 may be provided to increase rigidity of the structure. In the preferred embodiment, the station 12 includes an integral pour spout 112 formed in a side wall thereof projecting outwardly from the side wall to form an opening 114. The spout may be of sufficient size to accommodate a hand or a separate hand opening may be provided. As with the pour spout 70 of the container 10, the pour spout 112 includes a straight internal wall having an upper edge or surface 112 which is free of a rim or a ridge, facilitating easy pouring between the container 10 and the station 12. In the preferred embodiment, the top 110 includes an integral lid 116 which is secured to the top along a live hinge 118. A sliding latch 120 is provided in the lid 116 and has a strike or other means which is adapted to be received in a keeper such as the slot 122, in the same manner as the latch for container 10.

Where desired, the station 12 may include interior partitions 124, whereby the container may be subdivided into a plurality of compartments 126 and 128 (FIG. 7). This permits a different of species of live bait to be stored in a single container 12 without commingling the bait. When a multiple chamber container is utilized, a pour spout would be provided in one of the side walls associated with each chamber, as indicated by the pour spout 130 in side wall 108. Each additional pour spout would also include an integral hatch or lid 132 and a latch 134.

Also, in the preferred embodiment, a handle 136 is integrally formed in the top wall 110 of the station, whereby the container may be carried. The handle 136 is also adapted for receiving a tether line or the like, whereby the container may be suspended in the water and readily retrieved to the surface.

As is typical, the upper portion of each of the side walls 102, 104, 106 and 108 includes a plurality of holes 140 or slots 142, whereby a fresh supply of water can continuously enter the station, enhancing the environment for the live bait stored therein. Also, where desired, through slots 144 may be provided in the various lids 116 and 132 which cover the pour spout openings. The construction of the station 12 readily permits bait to be poured from a portable container such as the bucket 10 into the opening of the pour spout 112 without interference of or manipulation by the human hand. This greatly improves the maintenance of the bait. Also, by providing a straight tapered pour spout, without a rim, bait may be readily poured from the station 12 into a portable bait container such as the bucket 10 without additional handling of the bait and eliminating the need for dipping the bait out 7ith a net.

The opening of the pour spout 114 in the station may be sufficiently large enough to permit rocks or other weighted objects to be placed in the bottom of the container 110 whereby the container may be weighted to assure that it is properly positioned in the water.

While certain features and objects of the invention have been described in detail herein, it will be readily understood that the invention encompasses all modifications and enhancements within the scope and spirit of the following claims.

What is claimed is:

1. A live bait container and live bait station combination, comprising:
   a. a station including a bottom, upstanding side walls and atop, a pour spout in one of said side walls, the pour spout having side walls of a continuous straight curve for facilitating pouring of bait from the container, an opening associated with said pour spout and of sufficient size to accommodate a hand, and a handle in the top for carrying the container; and
   b. a bait container having a closed bottom, closed sides and a substantially closed top, the top including an opening of sufficient size to accommodate a hand, a lid hingedly connected to the top and adjacent to one of said sides, the lid movable between an open position and a closed position for selectively opening and closing the opening, a latch associated with the lid and the container for normally holding the lid in the closed position, and a pour spout formed in said one side and integral with said opening, the pour spout having side walls of a continuous straight curve for facilitating pouring of bait from the station, whereby bait may be poured between the container and the station.

2. The combination of claim 1, wherein the other of said sides of the bait container is hydrodynamically shaped for permitting the bucket to be pulled through the water with a minimum of resistance.

3. The combination of claim 1, wherein opposite side walls of the station each include a pour spout and there is further included a partition spanning the top and bottom and spanning the station between said side walls for separating the station into two compartments.

4. The combination of claim 1, wherein:
   a. a station further includes a lid hingedly attached to said station and configured to cover both the opening and the pour spout, the lid movable between open and closed positions, and a latch associated with the lid and first compartment for normally maintaining the lid in the closed position; and b. the bait container further includes a lid hingedly attached to said bait container and configured to cover both the opening and the pour spout, the lid movable between open and closed positions, and a latch associated with the lid and second compartment for normally maintaining the lid in the closed position.

5. The combination of claim 1, further comprising means for suspending the station in a preselected zone within a body of water.

6. The combination of claim 1, wherein the station is subdivided into a plurality of chambers and wherein the bait container is adapted to be slidable received in each of said chambers.

7. A trollable bait container for storing live bait in a source of water, comprising:

a. chamber having a closed bottom, closed sides, and a substantially closed top;

b. the top including an opening sufficiently large enough to accommodate a hand;

c. a lid hingedly connected to the top and adjacent one of said sides, the lid movable between an open position and a closed for selectively opening and closing the opening;

d. a latch associated with the lid and the container for normally holding the lid in the closed position;

e. where the other side of said sides is hydrodynamically shaped for permitting the container to be pulled through the water with a minimum of resistance;

f. a handle secured to the top of the container;

g. a pour spout formed in said one side and integral with said opening, whereby bait may be poured from the container;

h. wherein the pour spout is of a straight walled construction, whereby the pouring action is unrestricted; and i. wherein the lid conforms to the opening and the pour spout for selectively opening and closing both thereof.

8. A trollable bait container for storing live bait in a source of water, comprising:

a. a chamber of unitary construction having a closed bottom, closed sides and a substantially closed top;

b. the top including an opening sufficiently large enough to accommodate a hand;

c. a lid hingedly connected to the top in adjacent one of said sides, the lid movable between an open position and a closed for selectively opening and closing the opening;

d. a latch associated with the lid and the container for normally holding the lid in the closed position;

e. wherein the other side of said sides is hydrodynamically shaped for permitting the container to be pulled through the water with the minimum of resistance;

f. a handle secured to the top of the container;

g. a rudder projecting outwardly from said hydrodynamically shaped side for controlling the position and direction of the container when it is pulled through the water;

h. a pour spout formed in said one side and intrical with said opening, whereby bait may be poured from the container;

i. wherein the rudder is pivotally secured to the hydrodynamically shaped side, whereby the towing direction of the container is adjustable; and j. wherein the pour spout is of a straight-walled construction, whereby the pouring action is unrestricted, and wherein the lid conforms to both the opening and the pour spout for selectively opening and closing both thereof.

9. A station for storing live bait, the station comprising:

a. a bottom, upstanding side walls and a top;

b. a pour spout in one of said side walls, the pour spout having side walls of a continuous straight curve for facilitating pouring of bait from the container;

c. an opening associated with said pour spout and of sufficient size to accommodate a hand;

d. a handle in the top for carrying the container; and e. wherein opposite side walls each include a pour spout and there is further included a partition spanning the top and bottom and spanning the container between said side walls for separating the station into a plurality of compartments.

10. The station of claim 9, further including through holes in the side walls of the station for permitting water to run through the station when the station is suspended in a body of water.

11. A station for storing live bait, the station comprising:

a. a bottom, upstanding side walls and a top;

b. a pour spout in one of said side walls, the pour spout having side walls of a continuous straight curve for facilitating pouring of bait from the container;

c. an opening associated with said pour spout and of sufficient size to accommodate a hand;

d. a handle in the top for carrying the container; and e. a lid hingedly attached to said station and configured to cover both the opening and the pour spout, the lid movable between open and closed positions, and a latch associated with the lid and container for normally maintaining the lid in the closed position.

12. The station of claim 11, further including through holes in the side walls of the station for permitting water to run through the station when the station is suspended in a body of water.

* * * * *